UNITED STATES PATENT OFFICE.

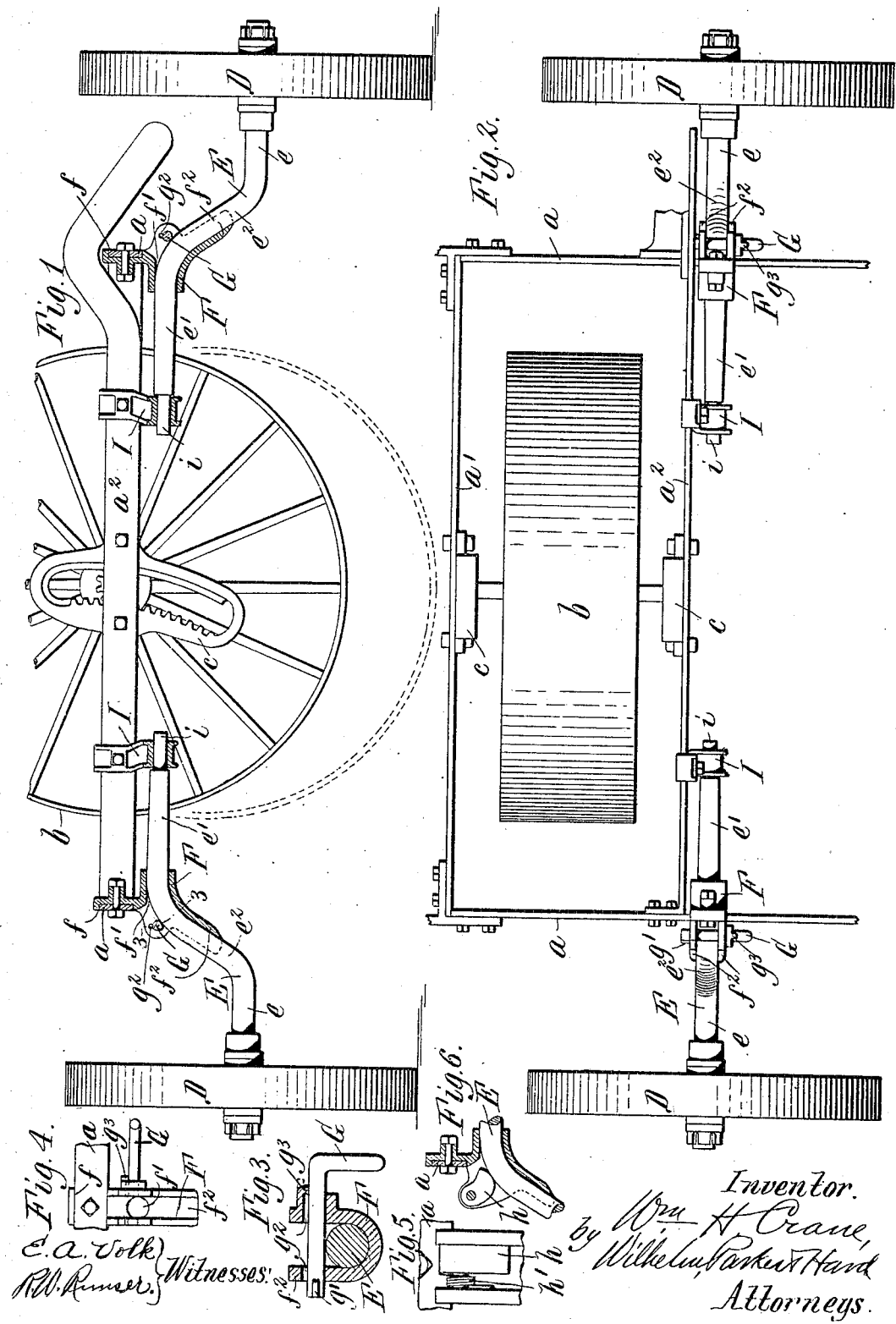

WILLIAM H. CRANE, OF POUGHKEEPSIE, NEW YORK, ASSIGNOR TO ADRIANCE, PLATT & COMPANY, OF POUGHKEEPSIE, NEW YORK.

TRUCK FOR HARVESTING-MACHINES.

No. 851,345.　　　　Specification of Letters Patent.　　　Patented April 23, 1907.

Application filed June 30, 1905. Serial No. 267,735.

*To all whom it may concern:*

Be it known that I, WILLIAM H. CRANE, a citizen of the United States, residing at Poughkeepsie, in the county of Dutchess and State of New York, have invented a new and useful Improvement in Trucks for Harvesting-Machines, of which the following is specification.

This invention relates more particularly to trucks for temporary attachment to harvesting and other machines for transporting them from place to place.

Harvesting machines are ordinarily too wide to be drawn forwardly on their driving or supporting wheels through gates or other relatively narrow openings and along narrow roads, and detached truck wheels are provided which are temporarily attached to the machine frame in such position that the machine can be transported thereon sideways, that is with its greatest width in the direction of movement of the machine. The truck wheels are journaled on stub axles adapted to be attached to the machine, and to be detached therefrom when not in use so as not to form permanent projections on the frame, and to enable the use of small truck wheels the stub axles are usually cranked or have their journals or outer ends offset downwardly from their inner or attaching portions. It is common practice to make the attaching portions of the stub axles angular or square in cross-section and seat them in correspondingly shaped attaching sockets to hold the axles from turning. The cranked axle of angular cross-section is more expensive to make than a cylindrical axle, and as the length of the depending crank portion of the axle is much greater than the diameter of its attaching end, the leverage and strain on the holding bracket or socket piece is relatively great and causes undue wear on the parts.

The object of this invention is to provide an improved connection for such truck axles of simple and inexpensive construction, which will ensure a rigid and secure attachment and will enable the axles to be readily attached to and detached from the machine.

In the accompanying drawings: Figure 1 is a side elevation, partly in section, of a portion of a harvesting machine supplied with a truck embodying the invention. Fig. 2 is a plan view thereof. Fig. 3 is a sectional elevation, on an enlarged scale, in line 3—3, Fig. 1, of one of the truck axles and the outer bracket therefor. Fig. 4 is an end elevation of the outer axle bracket, without the axle. Figs. 5 and 6 are an end elevation and sectional elevation, respectively, of a portion of an axle and an outer bracket provided with a different axle retaining device.

Like letters of reference refer to like parts in the several figures.

A portion of the supporting frame of a harvesting or other machine is shown in the drawings consisting of front and rear cross-bars $a$ connected by longitudinal side and intermediate bars $a'$ $a^2$.

$b$ represents the main drive wheel which is located between and journaled in bearings on the longitudinal bars $a'$ $a^2$ of the frame. The bearings for the drive wheel, as usual, are adjustable vertically on the frame, for instance, in guides, such as shown at $c$, to regulate the elevation of the frame and are thereby adapted to be raised off of the ground when the truck is in use.

D represents the truck wheels and E the cranked axles therefor. The latter consist, as usual, of outer horizontal journal arms $e$ for the wheels, inner raised arms $e'$ for attachment to the machine frame and upright connecting crank portions $e^2$.

The machine frame is provided with brackets or socket pieces in which the axles are removably secured, an inner and an outer bracket being preferably provided for each axle. In the construction shown in the drawings, the outer bearing brackets or socket pieces F are secured to the front and rear cross-bars $a$ of the frame near the intermediate longitudinal bar $a^2$. The outer bracket may be secured to the frame bar in any suitable manner insuring a strong rigid connection, for instance it is bolted at its upper end to the frame bar and has a horizontal seat $f$ in which the bar rests to hold the bracket from twisting out of a true vertical position. The bracket depends below the frame bar and is provided below the bar with a socket $f'$ through which the attaching arm $e'$ of the axle passes and in which it bears. To prevent the axle from turning in the socket $f'$ the bracket is provided with a depending portion $f^2$ which is grooved vertically or provided with side flanges to embrace the crank portion of the axle which is seated in the groove or between the flanges. The crank portion of the axle is by this means grasped securely for a considerable part of its length, or to a considerable distance from the attaching arm $e'$ of the axle, whereby the axle is held perfectly rigid and the leverage of the axle due to the crank portion is virtually eliminated.

The axle can be releasably retained in the bracket by any suitable device capable of ready and easy operation. In the construction shown in Figs. 1—4 a sliding bolt G is used for this purpose which passes through holes in the flanges of the bracket in front of the crank portion of the axle. The bolt has a handle at one end and a lug $g'$ at one side of its opposite end which engages with the side of the bearing and prevents the longitudinal movement of the bolt to release the axle unless the bolt is rotated to place its lug $g'$ into line with lug slots $g^2$ in the flanges of the bracket. When the bolt is thus turned it can be slid lengthwise from in front of the crank portion of the axle, thus leaving the axle free to be slipped out of the bracket. The complete withdrawal and loss of the bolt is prevented by a guard lug $g^3$ on the side of the bracket adjacent to the bolt handle, which closes the adjacent lug slot and limits the movement of the bolt by engaging the lug $g'$ thereon. When the bracket is made the guard lug $g^3$ projects out above the lug slot, as indicated by dotted lines in Fig. 3, so that the bolt can be inserted in the bolt holes, and the lug is turned down to the position shown by full lines in said Fig. 3 after the bolt is inserted. Another retaining device for the axle is shown in Figs. 5 and 6. This consists of a cam $h$ which is pivoted between the flanges of the bracket and is pressed against the crank portion of the axle by a spring $h'$. The shape of the cam is such that any outward movement of the axle will cause the cam to bind thereon. The axle can be inserted into and removed from the bearing bracket when the cam is swung upwardly.

The inner brackets I for the axles, in the construction shown, are bolted to the intermediate longitudinal frame-bar $a^2$ and have holes in their depending portions in which the reduced inner ends $i$ of the axles removably engage.

The axles, as shown, are made of round rods because this construction is the least expensive, and the axle grooves and sockets of the holding brackets are shaped to fit the axles, but while round axles are greatly preferred this shape is not essential and other cross-sectional shapes may be used, if desired. While separate inner and outer holding brackets are desirable and produce a strong connection with little weight, it will be manifest that the inner brackets could be dispensed with by extending the sockets of the outer brackets far enough to afford bearings of proper length for the attaching arms of the axles.

To attach the truck axles to the machine, the frame of the machine is elevated relative to the driving wheel in the usual way and the truck axles inserted and secured in their brackets. The driving wheel is then raised from the ground so that the machine is supported by the truck wheels. The truck axles are detached by reversing these operations.

I claim as my invention:

1. The combination of a cranked stub axle comprising an inner attaching arm, an outer journal arm and a connecting crank portion, a frame, and a holding bracket secured to the frame and comprising a socket arranged in line with the attaching arm of the axle and receiving the same and an outwardly facing recessed seat which receives the crank portion of the axle and prevents the axle from turning in said socket, substantially as set forth.

2. The combination of a cranked stub axle comprising an inner attaching arm, an outer journal arm and a connecting crank portion, a frame, a holding bracket secured to the frame and having an outwardly facing recessed seat which receives the crank portion of the axle and prevents the same from turning, and a socket which is secured to the frame and receives the inner end of the attaching arm, substantially as set forth.

3. The combination of a cranked axle, a holding bracket adapted to be secured to a harvesting or other machine to detachably receive said axle, said bracket having a depending seat to receive and hold the crank portion of the axle, and means for releasably retaining said axle in said bracket, substantially as set forth.

4. The combination of a cranked axle, a holding bracket adapted to be secured to a harvesting or other machine and having a socket for the reception of the attaching arm of the axle and an upright seat to detachably receive the crank portion of the axle, and a socket for the inner end of said attaching arm, substantially as set forth.

5. The combination of a cranked axle, a holding bracket adapted to be secured to a harvesting or other machine to detachably receive the axle, said bracket having an upright seat to receive and hold the crank portion of the axle in an upright position, and a movable retaining device which engages against the outer side of the crank portion of the axle and releasably holds the axle in the bracket, substantially as set forth.

6. The combination of a cranked axle, a holding bracket adapted to be secured to a harvesting or other machine to detachably receive the axle, said bracket having an upright seat to receive and hold the crank portion of the axle in an upright position, and a removable bolt secured to said bracket and extending across the crank portion of the axle, substantially as set forth.

Witness my hand, this 22 day of June, 1905.

WILLIAM H. CRANE.

Witnesses:
　WEBSTER D. HASBROUCK,
　HOWARD A. SOMERS.